June 11, 1940. C. JOHNSON 2,203,790
MEASURING APPARATUS
Original Filed July 6, 1935

INVENTOR.
CLARENCE JOHNSON
BY Raymond D. Junkins
ATTORNEY.

Patented June 11, 1940

2,203,790

UNITED STATES PATENT OFFICE 2,203,790

MEASURING APPARATUS

Clarence Johnson, Cleveland Heights, Ohio, assignor to Bailey Meter Company, a corporation of Delaware Original application July 6, 1935, Serial No. 30,057. Divided and this application December 1, 1939, Serial No. 307,103

6 Claims. (Cl. 73—233)

This invention relates to apparatus for measuring the magnitude of a variable quality, quantity, condition, relation, etc., and particularly such variables as speed, temperature, pressure, rate of fluid flow, etc., although the variable may be of any physical, chemical, electrical, hydraulic, thermal, or other nature or characteristic.

One object is to provide a device differentiating an indication of quantity to produce a record and/or indication of rate.

A further object is to provide a device of the type described which is adapted to produce such a record and/or indication adjacent to, or remotely at a considerable distance from the actuator.

Another object is to provide a device for producing a record, or indication of the speed of a body.

Still another object is to provide an electrically actuated device of the type described.

Further objects will be apparent from the description and from the drawing in which.

Figures 1, 2:
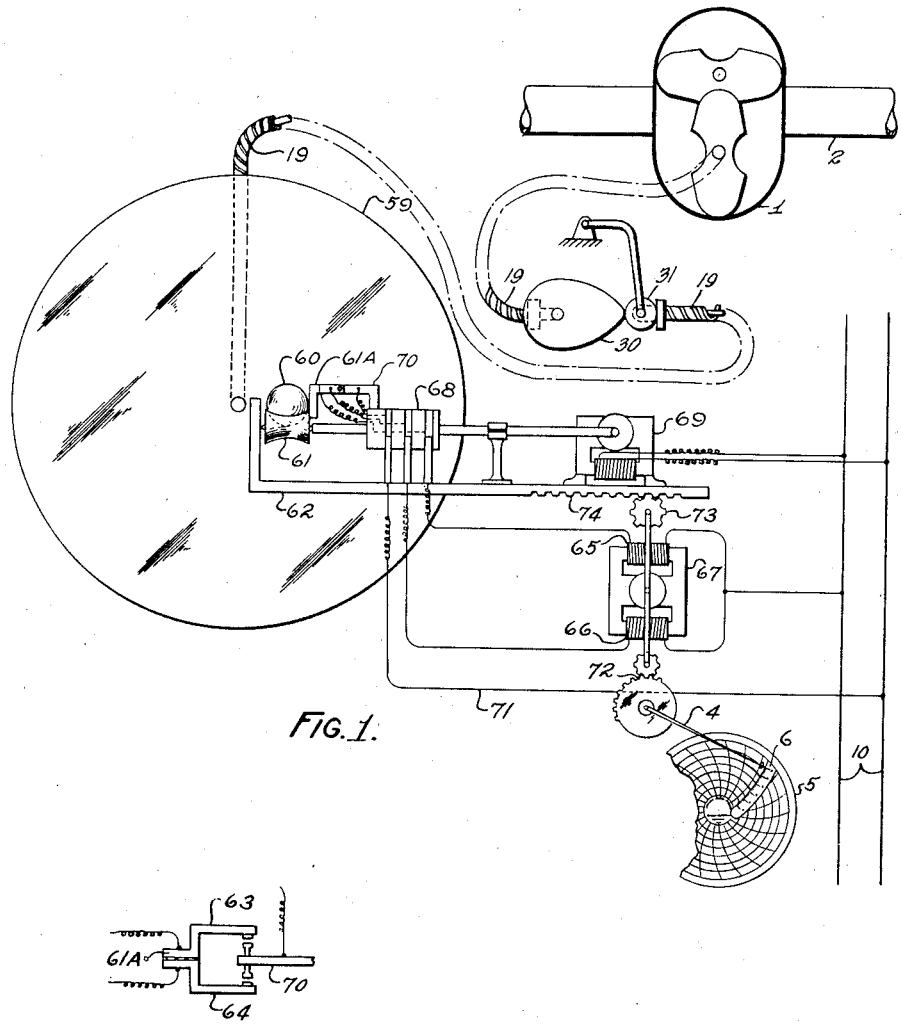
Fig. 1 is a diagrammatic illustration of an embodiment of my invention.
Fig. 2 is a fragmentary view of a part of the apparatus shown in Fig. 1.

I have chosen to illustrate and will describe my invention as applied to the measurement of the rate of flow of a fluid. As known, the total volume of fluids, such as alcohol, methanol, fuel oil, molasses, paint, or the like, passing through a conduit in a given length of time, are conveniently and accurately measured by positive displacement meters which have as a primary element a chamber or chambers through which the fluid passes in successive isolated quantities, either weight or volume. These quantities may be separated from the stream and isolated by alternate filling and emptying containers of known capacity and fluid cannot pass through without actuating the primary device. The secondary element of such a meter normally consists of a counter with suitably graduated dials for indicating the total quantity that has passed through the meter up to the time of reading. It is frequently desirable, however, that an indication or record of the instantaneous rate of flow of such fluid be available, and my invention contemplates a device producing such a record and/or indication actuated by the shaft of the registering gear train or any other suitable shaft within the displacement meter.

Referring to Fig. 1, I have therein shown a flexible shaft 19 connected to and driven by a positive displacement meter (not shown) which is positioned in a pipe or conduit for measuring the flow of fluid therethrough. The positive displacement meter may be provided with a suitable register from which the total flow passing through the pipe up to the time of reading may be ascertained.

To record and/or indicate the rate of flow of fluid through the conduit I provide a suitable exhibiting means as a pen arm 4 cooperating with a suitably graduated time rotatable chart 5 to give a permanent visible record of the rate of flow. Likewise cooperating with the pen arm 4 is an index or graduated scale 6, which provides an indication of the rate of flow existing at the instant of observation.

Throughout the specification and the appended claims, it is intended that exhibiting means shall denote any device or combination of devices for displaying in one or more forms the magnitude or other quality of the variable being measured. Thus it may denote a pointer which will provide an indication by observation of its movement or position with reference to a chart or graduated scale, or a device providing a permanent visible record of such indication, or any desired combination of such devices.

In Fig. 1 I provide a disc 59 adapted to be rotated by the displacement meter 1 through the shaft 19. Frictionally engaging the disc 59 is a sphere or ball 60 likewise frictionally engaging a rotatable spool 61 supported by a carriage 62. The spool 61 is provided with an arm 61A, as shown in Fig. 2, carrying a pair of contacts 63 and 64 connected through suitable slip rings in a drum 68 to opposed fields 65 and 66 respectively of a motor 67. The drum 68 is rotated preferably at constant speed by a motor 69 connected to the source 10 and carries a contact 70 cooperating with the contacts 63 and 64. The contact 70 is connected through a slip ring in the drum 68 directly to the source through a conductor 71. The arrangement is such that upon engagement of the contact 70 with the contact 63 the field 65 is energized, and conversely upon engagement of the contact 70 with the contact 64 the field 66 is energized. The motor 67 is adapted to drive the pen arm 4 through gears 72 and in unison therewith the carriage 62 through a gear 73 meshing with a suitable rack 74 formed in the carriage 62.

In operation, assuming the system to be in equilibrium, the contacts 63 and 64 will be rotated at synchronous speed with the contact 70 so that fields 65 and 66 of motor 67 are deenergized. Upon an increase in the rate of flow through the conduit 2, for example, the rotative speed of the disc 59 will increase, increasing the speed of the contacts 63 and 64 over that of the contact 70, which will accordingly engage the contact 68 to energize the field 65 of the motor 67 to drive the carriage 62 toward the center of the disc 59, thereby decreasing the rotative speed of the contacts 63 and 64 until it is again equal to that of the contact 70. Simultaneously the motor 67 will position the pen arm 4 upwardly to indicate an increase in the rate of flow of fluid through the conduit. Conversely upon a decrease in the rate of flow of fluid through the conduit, the rotative speed of the disc 59 will decrease, decreasing the speed of the contacts 63 and 64 below that of the contact 70, which will accordingly engage the contact 64 to energize the field 66 of the motor 67 to move the carriage 62 radially out from the center of the disc 59, thereby increasing the speed of the contacts 63 and 64 to that of the contact 70. Simultaneously the pen arm 4 will be positioned downwardly to indicate the decrease in the rate of flow of fluid through the conduit.

In case the structure of the meter 1 is such that the speed of its shaft extension varies from strict linear proportionality, within a revolution, from the rate of flow of fluid through the pipe 2, I may interpose in the shaft 19 a driving cam 30 and a pivotally supported cam follower 31. The cam 30 may be so shaped that regardless of variations in angular speed of the meter shaft extension during one revolution the follower 31, and accordingly the shaft 19 leading to the disc 59, will rotate at constant speed for a given rate of flow through the pipe 2.

While the example of my invention hereinbefore described refers to the measurement of the rate of flow of a fluid, it will be understood that it is applicable as well for effecting the measurement of any other condition or variable. For example, the flexible shaft 19 may be driven by a rotating shaft, the speed of which it is desired to indicate and/or record, and the total revolutions of which may be exhibited by a suitable register; or it may be arranged to be driven from the rotating shaft of a watt hour meter to exhibit the rate of usage of electric power.

This application is a division of my copending application Serial No. 30,057 filed in the United States Patent Office July 6, 1935.

What I claim as new, and desire to secure by Letters Patent of the United States is:

1. In a measuring device in combination, an electro-responsive device having electrically opposed windings, a member movable in accordance with the magnitude of a variable, two contacts under the joint control of said member and said electro-responsive device, a time responsive device, and a third contact actuated by said time responsive device, engagement of said third contact with one of said two contacts energizing said electro-responsive device in one direction and engagement of said third contact with the other of said two contacts energizing said electro-responsive device in the opposite direction.

2. Apparatus comprising a disc rotatable in accordance with the magnitude of a variable, a rotatable member in driving engagement with said disc, a carriage for said member radially movable relative to said disc, two contacts carried by said member, a third contact normally in spaced relation to said two contacts and supported on said carriage, means for rotating said third contact at a constant rate of speed; and an electro-responsive means for moving said carriage controlled by the co-action of said contacts.

3. Apparatus comprising a pair of movable contacts, driving means for varying the speed of said contacts in accordance with changes in the magnitude of a variable, a cooperating third contact normally in spaced relation from said two contacts, means for driving said third contact at a predetermined rate of speed, electro-responsive means operating in opposite directions; engagement of said third contact with one of said pair of contacts effecting operation of said electro-responsive means in one direction, and engagement of said third contact with the other of said pair effecting operation of said electro-responsive means in opposite direction, and a variable speed transmission under the control of said electro-responsive means for maintaining the speed of said pair of contacts at a predetermined magnitude.

4. A fluid meter, in combination, a revoluble surface, a displacement meter for revolving said surface at a speed dependent upon the rate of flow of fluid, means for compensating the speed of said surface for variations of speed of said displacement meter from proportionality with the rate of flow of fluid, a rotatable member in driving engagement with said surface, a second member associated with said first member, means for rotating said second member at predetermined speed; and actuating means under the joint control of said members.

5. In a fluid meter, in combination, driving means operated at a speed proportional to the magnitude of the rate of flow of said fluid, a pair of contacts driven by said first named means, and a variable speed transmission for maintaining said contacts at a constant speed comprising a reversible motor for moving said pair of contacts relative to said driving means, a third contact normally in spaced relation to said pair of contacts; engagement of said third contact with one of said pair of contacts effecting operation of said reversible motor in one direction, and engagement of said third contact with the other of said pair effecting operation of said reversible motor in opposite direction.

6. Apparatus comprising a disc rotatable in accordance with the magnitude of a variable, a reversible motor having opposed windings, contact means for controlling the energization of said windings having a plurality of rotatable elements radially movable relative to said disc by said reversible motor, means for rotating one of said elements at a speed proportional to the speed of said disc and its radial position relative to the center of said disc, and means for rotating the other of said elements at a constant rate of speed.

CLARENCE JOHNSON.